United States Patent
Yang et al.

(10) Patent No.: US 11,368,855 B2
(45) Date of Patent: Jun. 21, 2022

(54) NETWORK CONVERGENCE METHOD AND DEVICE, ELECTRONIC APPARATUS, AND STORAGE MEDIUM

(71) Applicant: Beijing Baidu Netcom Science and Technology Co., Ltd., Beijing (CN)

(72) Inventors: Shengwen Yang, Beijing (CN); Wenwu Zhu, Beijing (CN); Mingyang Dai, Beijing (CN)

(73) Assignee: Beijing Baidu Netcom Science And Technology Co., Ltd., Beijing (CN)

( * ) Notice: Subject to any disclaimer, the term of this patent is extended or adjusted under 35 U.S.C. 154(b) by 220 days.

(21) Appl. No.: 16/945,834

(22) Filed: Aug. 1, 2020

(65) Prior Publication Data
US 2021/0076224 A1     Mar. 11, 2021

(30) Foreign Application Priority Data

Sep. 10, 2019   (CN) .......................... 201910858156.6

(51) Int. Cl.
*H04W 16/18* (2009.01)
*G06N 3/08* (2006.01)
*H04W 24/02* (2009.01)

(52) U.S. Cl.
CPC ............. *H04W 16/18* (2013.01); *G06N 3/08* (2013.01); *H04W 24/02* (2013.01)

(58) Field of Classification Search
CPC ...... H04L 41/16; H04W 16/18; H04W 24/02; G06N 3/08; G06N 3/0454; G06N 3/082; G06K 9/6288
See application file for complete search history.

(56) References Cited

U.S. PATENT DOCUMENTS

| 2008/0103784 A1* | 5/2008 | Wong | ................... G06Q 10/101 705/300 |
| 2010/0311393 A1* | 12/2010 | Castleman | ............. H04L 67/14 455/412.1 |

(Continued)

FOREIGN PATENT DOCUMENTS

| CN | 108768843 A | * 11/2018 |
| CN | 109635989 A | 4/2019 |

(Continued)

OTHER PUBLICATIONS

"Balancing User Profile and Social Network Structure for Anchor Link Inferring Across Multiple Online Social Networks"; Ma et al.; Special Section on Intelligent Systems for the Internet of Things; Jun. 2017 (Year: 2017).*

(Continued)

*Primary Examiner* — Benjamin H Elliott, IV
(74) *Attorney, Agent, or Firm* — Akerman LLP (57) ABSTRACT

A network convergence method and device, an electronic apparatus, a storage medium are provided. The method includes: taking online information obtained at least from network data as first nodes, and constructing a first network with the first nodes based on an association among the online information, the online information including at least one account and at least one piece of network media information; taking offline information obtained at least from mobile communication data as second nodes, and constructing a second network with the second nodes based on an association among the offline information, the offline information including at least one terminal identifier and location information of a terminal corresponding to the at least one terminal identifier; and converging the first network and the second network by using an association between the account (Continued)

in the online information and the terminal identifier in the offline information, to construct a heterogeneous network.

20 Claims, 4 Drawing Sheets

(56) References Cited

U.S. PATENT DOCUMENTS

| | | | | |
|---|---|---|---|---|
| 2015/0245168 A1* | 8/2015 | Martin | ................... | H04W 4/02 |
| | | | | 715/751 |
| 2017/0223118 A1* | 8/2017 | Nishikawa | .............. | H04W 4/21 |
| 2019/0325042 A1* | 10/2019 | Yu | ............................ | G06F 40/30 |
| 2020/0250514 A1* | 8/2020 | Kim | ....................... | G06V 10/25 |
| 2020/0293783 A1* | 9/2020 | Ramaswamy | ............ | G06N 3/00 |
| 2021/0076224 A1* | 3/2021 | Yang | ..................... | H04W 16/18 |
| 2021/0217109 A1* | 7/2021 | Dai | ......................... | H04L 67/22 |

FOREIGN PATENT DOCUMENTS

| | | | |
|---|---|---|---|
| CN | 110336825 A | * | 10/2019 |
| CN | 112492003 A | * | 3/2021 |
| WO | 2014/169823 A1 | | 10/2014 |

OTHER PUBLICATIONS

"Community Detection in Location-based Social Networks: An Entropy-based Approach"; Liu et al.; 2016 IEEE International Conference on Computer and Information Technology (Year: 2016).*
"Cross-Community Sensing and Mining"; Guo et al.; IEEE Communications Magazine; Aug. 2014 (Year: 2014).*
"Facecounter: bridging the gap between offline and online social networks"; Gaito et al.; 2012 Eighth International Conference on Signal Image Technology and Internet Based Systems; (Year: 2012).*
"From Online Behaviors to Offline Retailing"; Luo et al.; KDD Aug. 2016 (Year: 2016).*
"Survey on real time traffic analysis on Big Data"; Vidya et al.; Proceedings of the 2nd International Conference on Trends in Electronics and Informatics (ICOEI) 2018 (Year: 2018).*
"Position-sensitive Propagation of information on social media using social physics approach"; Ishii et al.; 2017 IEEE International Conference on Big Data (BIGDATA) (Year: 2017).*
First Office Action and Search Report dated Aug. 26, 2021 issued in connection with corresponding Chinese Patent Application No. 201910858156.6.
Research on User Community Discovery Method in Location Based Social Network, Apr. 14, 2017.
Urban Traffic Analysis Technology in Beg Data Environment, Jan. 31, 2015.

* cited by examiner

NETWORK CONVERGENCE METHOD AND DEVICE, ELECTRONIC APPARATUS, AND STORAGE MEDIUM

CROSS-REFERENCE TO RELATED APPLICATION

This application claims priority to Chinese Patent Application No. 201910858156.6, filed on Sep. 10, 2019, which is hereby incorporated by reference in its entirety.

TECHNICAL FIELD

The present application relates to a field of data processing, and in particular, to a field of big data.

BACKGROUND

In recent years, an internet virtual space is a very popular and important information space. Many methods for learning user feature representations in the internet virtual space have emerged, such as based on big data, natural language processing and a deep neural network. However, the internet virtual space is only a unary information space. Information is always lossy when researching user features based on the unary information space.

SUMMARY

A network convergence method and device, an electronic apparatus and a storage medium are provided according to embodiments of the present application, to construct a multi-heterogeneous network, so as to solve at least the information-loss problem in the existing technology.

In a first aspect, a network convergence method is provided according to an embodiment of the application, which includes:

taking online information obtained at least from network data as first nodes, and constructing a first network with the first nodes based on an association among the online information, the online information including at least one account and at least one piece of network media information;

taking offline information obtained at least from mobile communication data as second nodes, and constructing a second network with the second nodes based on an association among the offline information, the offline information including at least one terminal identifier and location information of a terminal corresponding to the at least one terminal identifier; and converging the first network and the second network by using an association between the account in the online information and the terminal identifier in the offline information, to construct a heterogeneous network.

Here, the first network for an internet virtual space is established using the online information, and the second network for a true physical space is established using the offline information. Then the first network and the second network are converged by using the association between the online and offline information, such as the association between the account in the online information and the terminal identifier in the offline information. In this way, the heterogeneous network is constructed, and the heterogeneous network is a multi-heterogeneous network. Therefore, this will maximize the reservation of the online information, the offline information, and various interactions between the online and offline information, so that the online information and the offline information can be converged, thereby solving the problem of loss of the network information. At the same time, each node in the heterogeneous network is comparable in a heterogeneous space (e.g. a convergence space) corresponding to the heterogeneous network, which lays a foundation for an information research from different dimensions.

In an embodiment, the taking online information obtained at least from network data as first nodes, and constructing a first network with the first nodes based on an association among the online information includes:

taking a first account obtained from the network data and the network media information accessed by the first account, as the first node; and constructing the first network with the first nodes based on an access relation.

Here, the online information with multiple dimensions is homogenized and taken as nodes in the first network. For example, both the account and the network media information accessed by the account are taken as the first nodes, and the nodes are connected based on the access relation. Then, the first network is constructed, so that the first network can represent an association between the account and the network media information, which lays a foundation for subsequently maximizing representation of the interrelation between different information.

In an embodiment, the method further includes:

taking a first account obtained from the network data and an application logged in and accessed by the first account, as the first nodes; and constructing the first network with the first nodes based on a logged-in access relation.

Here, the online information with multiple dimensions is homogenized and taken as nodes in the first network. For example, both the account and the application logged in and accessed by the account are taken as the first nodes, and the nodes are connected based on the logged-in access relation. Then, the first network is constructed, so that the first network can represent an association between the account and the application. In this way, the information dimension can be enriched, which is represented by the nodes in the first network, thereby enriching the node dimension in the first network and expanding the first network, which lays a foundation for subsequently maximizing representation of the interrelation between different information.

In an embodiment, the taking online information obtained at least from network data as first nodes, and constructing a first network with the first nodes based on an association among the online information further includes:

taking a first account obtained from the network data and a second account having an interaction with the first account, as the first node; and constructing the first network with the first nodes based on the interaction between the first account and the second account.

In other words, the online information with multiple dimensions is homogenized and taken as nodes in the first network. For example, an account and other accounts associated with the account are taken as the first nodes. Then the first network is constructed based on the interaction between the accounts, so that the first network can represent the interaction between the accounts. In this way, the information dimension can be enriched, which is represented by the nodes in the first network, thereby enriching the node dimension in the first network and further expanding the first network, which lays a foundation for subsequently maximizing representation of the interrelation between different information.

In an embodiment, the constructing a first network with the first nodes based on an association among the online information includes:

determining a length of a link between the account and the network media information accessed by the account, based on an association between the account and the network media information in the online information; and constructing the first network with the first nodes by using the length of the link between the account and the network media information accessed by the account.

In other words, the online information with multiple dimensions is homogenized and taken as the node in the first network. Then, the length of the link can be determined based on the association among the information with multiple different dimensions, wherein the link is between the first node representing the account and the first node representing the network media information accessed by the account. The two first nodes are connected based on the length of the link to construct a first network, so that not only can the association between the account and the network media information be represented by the first network, but also the association strength between the associated nodes can be represented using the characteristics of the link, such as, a length value of the link. In this way, the information dimension represented by the first network can be further enriched, which lays a foundation for subsequently maximizing representation of the interrelation between different information. Moreover, the above process is simple to be implemented, which lays the foundation for industrialized applications.

In an embodiment, the taking offline information obtained at least from mobile communication data as second nodes, and constructing a second network with the second nodes based on an association among the offline information includes:

taking the terminal identifier obtained from the mobile communication data, a motion trajectory of the terminal corresponding to the terminal identifier, and a start point and an end point corresponding to the motion trajectory, as the second node; and constructing the second network with the second nodes based on associations between the terminal identifier and the motion trajectory, between the terminal identifier and the start point, and between the terminal identifier and the end point.

In other words, the offline information with multiple dimensions is homogenized and taken as the nodes in the second network. For example, the terminal identifier, a motion trajectory of the terminal corresponding to the terminal identifier, and the start point and the end point corresponding to the motion trajectory are taken as the second nodes. Then the second network is constructed based on the associations between the terminal identifier and the motion trajectory, between the terminal identifier and the start point, and between the terminal identifier and the end point. In this way, the information dimension represented by the nodes in the second network is enriched, thereby enriching the node dimension in the second network and expanding the second network, which lays the foundation for subsequently maximizing representation of the interrelation between different information.

In an embodiment, the constructing a second network with the second nodes based on an association among the offline information includes:

determining a length of a link between the terminal identifier and the location information associated with the terminal identifier, based on an association between the terminal identifier and the location information in the offline information; and constructing the second network with the second nodes by using the length of the link between the terminal identifier and the location information associated with the terminal identifier.

In other words, the offline information with multiple dimensions is homogenized and taken as nodes in the second network. Then, the length of the link can be determined based on an association among the information with multiple different dimensions, wherein the link is between the second node representing the terminal identifier and the second node representing the location information (that is, the location information of the terminal corresponding to the terminal identifier) associated with the terminal identifier. In this way, the two second nodes are connected to construct the second network, so that not only can the association between the terminal identifier and a geographical location be represented by the second network, but also the association strength between associated nodes can be represented using the characteristics of the link, such as, a length value of the link. In this way, the information dimension represented by the second network is further enriched, which lays a foundation for subsequently maximizing representation of the interrelation between different information. Moreover, the above process is simple to be implemented, which lays the foundation for engineering applications.

In an embodiment, the method further includes:

obtaining weights of the first network and the second network, and weighting a length of a link in the first network and a length of a link in the second network by using the weights of the first network and the second network respectively, to determine a length of a link between nodes in the heterogeneous network.

Here, weights of different networks can be determined according to different business requirements, and a length of a link in a network can be weighted using a weight corresponding to the network, so that the weights of different networks are comparable. In this case, the heterogeneous network may better represent the interaction between different nodes in the real environment/scenario, which lays a solid network foundation for a subsequent information research from different dimensions.

In an embodiment, the converging the first network and the second network by using an association between the account in the online information and the terminal identifier in the offline information includes:

determining an association between user information corresponding to the first account in the online information and user information corresponding to the terminal identifier in the offline information; in a case that the association is determined, converging the first network and the second network based on the association, to construct the heterogeneous network.

Here, a specific way is provided for convergence based on the association between the online and offline information in the embodiment. That is, the first network and the second network are converged based on the user information corresponding to the account in the online information and the user information corresponding to the terminal identifier in the offline information. In other words, the first network and the second network are converged based on the user information. For example, in a case that there is an association between the user information corresponding to the first account and the user information corresponding to the terminal identifier, the first node corresponding to the first account can be directly connected with the second node corresponding to the terminal identifier based on this association, so that the first network and the second network are converged. This convergence approach is not only simple to be implemented, but also true and easy to be understood. In this way, the heterogeneous space is also easy to be understood, which lays a foundation for subsequently maximizing representation of the interrelation between different nodes, and also lays a foundation for a subsequent research on user behavior from different dimensions based on the heterogeneous network.

In an embodiment, the converging the first network and the second network by using an association between the account in the online information and the terminal identifier in the offline information includes:

determining that user information corresponding to a first account in the online information is the same as user information corresponding to the terminal identifier in the offline information; and converging the first node representing the first account and the second node representing the terminal identifier into a convergence node representing the user information in response to determining the same user information, to construct the heterogeneous network with the first nodes, the second nodes, and the convergence node.

Here, a specific way is provided for convergence based on the association between the online and offline information in the embodiment. That is, the first network and the second network are converged based on the user information corresponding to the account in the online information and the user information corresponding to the terminal identifier in the offline information. For example, when the user information represented by the two networks is the same, the first node representing the first account and the second node representing the terminal identifier may be converged into a convergence node representing the user information, thereby achieving the convergence of the first network and the second network, enriching the information dimension represented by the nodes in the heterogeneous network, and further enriching the node dimension in the heterogeneous network. This approach is simple and easy to be understood, which lays a foundation for subsequently maximizing representation of the interrelation between different information, and also lays a foundation for a subsequent research on user behavior from different dimensions based on the heterogeneous space.

In an embodiment, the converging the first network and the second network by using an association between the account included in the online information and the terminal identifier included in the offline information includes:

determining that user information corresponding to a first account in the online information is different from user information corresponding to the terminal identifier in the offline information; determining whether there is an interaction between a third account corresponding to the terminal identifier and the first account, in response to determining different user information; in a case that there is the interaction, connecting the first node representing the first account with the second node representing the terminal identifier corresponding to the third account based on the interaction, to converge the first network and the second network to obtain the heterogeneous network.

Here, an approach is provided for convergence based on the association between the online and offline information in the embodiment. That is, the first network and the second network are converged based on the user information corresponding to the account in the online information and the user information corresponding to the terminal identifier in the offline information. For example, when the user information represented by the two networks is different, it can be further determined whether the terminal identifier corresponds to a third account. In a case that the terminal identifier corresponds to a third account, it can be further determined whether there is an interaction between the third account and the first account. In a case that there is the interaction, based on the interaction, the first node representing the first account is connected to the second node representing the terminal identifier corresponding to the third account, to converge the first network and the second network. This approach is simple and easy to be understood, which lays a foundation for subsequently maximizing representation of the interrelation between different information, and also lays a foundation for a subsequent research on user behavior from different dimensions based on the heterogeneous space.

In an embodiment, the method further includes:
determining vector features of nodes in the heterogeneous network; and
calculating a distance between the nodes in a convergence space represented by the heterogeneous network by using the vector features of the nodes.

This embodiment provides a method for representing each node in the heterogeneous network. For example, a vector is used to represent each node in the heterogeneous network. In this way, a vector can be used to calculate a distance between any two nodes in the convergence space (that is, the heterogeneous space) corresponding to the heterogeneous network. The distance can be used to represent the association strength between the nodes in the convergence space. In this way, the problem that nodes across the networks are not comparable is solved, which lays a foundation for subsequent research on user behavior from different dimensions based on the heterogeneous space.

In a second aspect, a network convergence device is provided according to an embodiment of the application, which includes:

a network constructing unit, configured to take online information obtained at least from network data as first nodes, and construct a first network with the first nodes based on an association among the online information, the online information including at least one account and at least one piece of network media information; take offline information obtained at least from mobile communication data as second nodes, and construct a second network with the second nodes based on an association among the offline information, the offline information including at least one terminal identifier and location information of a terminal corresponding to the at least one terminal identifier; and a converging unit, configured to converge the first network and the second network by using an association between the account in the online information and the terminal identifier in the offline information, to construct a heterogeneous network.

In an embodiment, the network constructing unit is further configured to: take a first account obtained from the network data and the network media information accessed by the first account, as the first node; and construct the first network with the first nodes based on an access relation.

In an embodiment, the network constructing unit is further configured to: take a first account obtained from the network data and an application logged in and accessed by the first account, as the first node; and construct the first network with the first nodes based on a logged-in access relation.

In an embodiment, the network constructing unit is further configured to: take a first account obtained from the network data and a second account having an interaction with the first account, as the first node; and construct the first network with the first nodes based on the interaction between the first account and the second account.

In an embodiment, the network constructing unit is further configured to:

determine a length of a link between the account and the network media information accessed by the account, based on an association between the account and the network media information in the online information; and construct the first network with the first nodes by using the length of the link between the account and network media information accessed by the account.

In an embodiment, the network constructing unit is further configured to:

take the terminal identifier obtained from the mobile communication data, a motion trajectory of the terminal corresponding to the terminal identifier, and a start point and an end point corresponding to the motion trajectory, as the second node; and construct the second network with the second nodes based on associations between the terminal identifier and the motion trajectory, between the terminal identifier and the start point, and between the terminal identifier and the end point.

In an embodiment, the network constructing unit is further configured to:

determine a length of a link between the terminal identifier and the location information associated with the terminal identifier, based on an association between the terminal identifier and the location information in the offline information; and construct the second network with the second node by using the length of the link between the terminal identifier and the location information associated with the terminal identifier.

In an embodiment, the converging unit is further configured to:

obtain weights of the first network and the second network, and weighting a length of a link in the first network and a length of a link in the second network by using the weights of the first network and the second network respectively, to determine a length of a link between nodes in the heterogeneous network.

In an embodiment, the converging unit is further configured to:

determine an association between user information corresponding to the first account in the online information and user information corresponding to the terminal identifier in the offline information; in a case that the association is determined, converge the first network and the second network based on the association, to construct the heterogeneous network.

In an embodiment, the converging unit is further configured to:

determine that user information corresponding to a first account in the online information is the same as user information corresponding to the terminal identifier in the offline information; and converge the first node representing the first account and the second node representing the terminal identifier into a convergence node representing the user information in response to determining the same user information, to construct the heterogeneous network with the first nodes, the second nodes, and the convergence node.

In an embodiment, the converging unit is further configured to:

determine that user information corresponding to a first account in the online information is different from user information corresponding to the terminal identifier in the offline information; determining whether there is an interaction between a third account corresponding to the terminal identifier and the first account, in response to determining different user information; in a case that there is the interaction, connect the first node representing the first account with the second node representing the terminal identifier corresponding to the third account based on the interaction, to converge the first network and the second network to obtain the heterogeneous network.

In an embodiment, the converging unit is further configured to:

determine vector features of nodes in the heterogeneous network; and calculate a distance between the nodes in a convergence space represented by the heterogeneous network by using the vector features of the nodes.

In a third aspect, an electronic apparatus is provided according to an embodiment of the application, which includes:

at least one processor; and a memory communicatively connected to the at least one processor; wherein the memory stores instructions executable by the at least one processor, and the instructions, when executed by the at least one processor, cause the at least one processor to implement the method according to any one of the embodiments of the present application.

In a fourth aspect, a non-transitory computer-readable storage medium is provided according to an embodiment of the application, wherein the executable instructions, when executed by a computer, causes the computer to implement the method according to any one of the embodiments of the present application.

One embodiment of the above application has the following advantages or beneficial effects: the first network for the internet virtual space is established using the online information, and the second network for the true physical space is established using the offline information. Then the first network and the second network are converged by using the association between the online and offline information, such as the association between the account in the online information and the terminal identifier in the offline information. In this way, the heterogeneous network is constructed, and the heterogeneous network is the multi-heterogeneous network. Therefore, this will maximize the reservation of the online information, the offline information, and various interactions between the online and offline information, so that the online information and the offline information can be converged, thereby solving the problem of loss of the network information. At the same time, each node in the heterogeneous network is comparable in the heterogeneous space (e.g. the convergence space) corresponding to the heterogeneous network, which lays a foundation for an information research from different dimensions.

Other effects of the foregoing optional manners will be described below in conjunction with specific embodiments.

BRIEF DESCRIPTION OF THE DRAWINGS

The drawings are used to better understand the solution and are not to be considered as limiting the present application, wherein.

DETAILED DESCRIPTION OF THE EMBODIMENTS

With reference to the accompanying drawings, exemplary embodiments of the present application are described below, which include various details of the embodiments of the present application to facilitate understanding and should be considered as merely exemplary. Therefore, those of ordinary skill in the art should recognize that various changes and modifications can be made to the embodiments described herein without departing from the scope and spirit of the application. Also, for clarity and conciseness, descriptions for known functions and structures are omitted in the following descriptions.

In a practical application, a unary information network for the internet virtual space can be established by using the following methods. For example, a network is established for user relations of different data sources from the user dimension, and is homogenized. Further, a vector characterization of a node is learned from the network by using technology of DeepWalk, Node2vec, Line and the like. In this way, a unary network space is obtained. However, a society is diverse. In a case that the network is established only through a unary dimension, the information is always lossy. Although the vector characterization of each node in each network is learned based on multiple unary networks, the nodes between the networks are not comparable in the same space. Therefore, a problem to be solved is how to converge multiple networks to construct a multi-heterogeneous network.

In this case, a network convergence method is provided according to an embodiment of the application, in which unary information spaces are organized in a form of a relation network to form the multi-heterogeneous network, and various interrelation information is reserved as much as possible. Particularly, a network is established based on online information in an internet virtual space, and another network is established based on offline information such as a geographic location space, then the two networks are converged based on an association between the online information and the offline information to obtain the heterogeneous network. Therefore, the nodes across the networks are comparable in the heterogeneous space corresponding to the heterogeneous network, which maximize the reservation of the interrelation information between different information.

Figure 1:
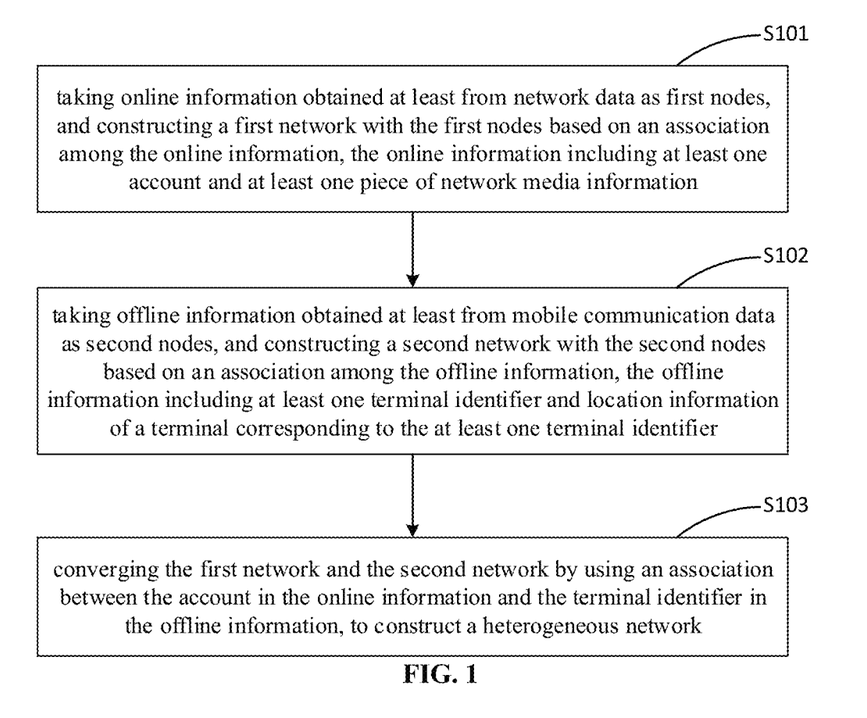
FIG. 1 is a schematic flowchart of a method according to a first embodiment of the present application.

Particularly, FIG. 1 is a schematic flowchart of a method according to a first embodiment of the present application. The method includes S101 to S103.

At S101, online information obtained at least from network data is taken as first nodes, and a first network with the first nodes is constructed based on an association among the online information, the online information including at least one account and at least one piece of network media information.

In the embodiment of the present application, the network media information may specifically be any information displayed on any platform (website and/or application) in the internet, for example, including but not limited to one of the following information: a picture, a moving graphic, a text, an audio, and a network link. The account can represent a user identifier used by the user to log in an application, that is, the account can directly correspond to the user information. In this way, as the account can establish an association with the network media information, and the account also corresponds to the user information, a first network represents an association between the user information and the network media information.

In a specific example, the user information may replace the account information and be directly taken as the first nodes. In this way, the first network constructed can directly represent the association between the user information and the network media information. Definitely, in a practical application, the same user information may correspond to multiple different accounts. At this time, multiple different accounts may be represented by the same user information. Alternatively, a user information node may be added in the first network, that is, the user information is also taken as the first node. At this time, associations between the user information and the account, and between the user information and the network media information, may be established. Accordingly, the online information may further include at least one user information.

In the embodiment of the present application, the first network may be constructed by using the following approaches.

Approach 1: a first account obtained from the network data and the network media information accessed by the first account are taken as the first nodes, and the first network with the first nodes is constructed based on an access relation. In other words, the online information with multiple dimensions is homogenized and taken as nodes in the first network. For example, both the account and the network media information accessed by the account are taken as the first nodes, and the nodes are connected based on the access relation. Then, the first network is constructed, so that the first network can represent an association between the account and the network media information.

Approach 2: a first account obtained from the network data and an application logged in and accessed by the first account are taken as the first nodes, and the first network with the first nodes are constructed based on a logged-in access relation. In other words, the online information with multiple dimensions is homogenized and taken as nodes in the first network. For example, both the account and the application logged in and accessed by the account are taken as the first nodes, and the nodes are connected based on the logged-in access relation. Then, the first network is constructed, so that the first network can represent an association between the account and the application. In this way, the information dimension can be enriched, which is represented by the nodes in the first network, thereby enriching the nodes in the first network and expanding the first network.

Approach 3: a first account obtained from the network data and a second account having an interaction with the first account are taken as the first node; and the first network with the first nodes are constructed based on the interaction between the first account and the second account. Here, the online information also includes the second account. In other words, the online information with multiple dimensions is homogenized and taken as nodes in the first network. For example, an account and other accounts associated with the account are taken as the first nodes. Then the first network is constructed based on the interaction between the accounts, so that the first network can represent the interaction between the accounts. In this way, the information dimension can be enriched, which is represented by the nodes in the first network, thereby enriching the node dimension in the first network and further expanding the first network.

In a practical application, one of the above three approaches may be selected and executed, or any two or three of them may be selected and executed, which is not limited by this embodiment of the present application, and may be applied according to requirements of an practical scenario.

In another specific example, the nodes in the first network may be connected by using the following method, which includes: determining a length of a link between the account and the network media information accessed by the account, based on an association between the account and the network media information in the online information; and constructing the first network with the first nodes by using the length of the link between the account and the network media information accessed by the account.

In other words, the online information with multiple dimensions is homogenized and taken as the nodes in the first network. Then, the length of the link can be determined based on the association among the information with multiple different dimensions, wherein the link is between the first nodes representing the account and the first node representing the network media information accessed by the account. The two first nodes are connected based on the length of the link to construct a first network, so that not only can the association between the account and the network media information be represented by the first network, but also the association strength between the associated nods can be represented by the first network using the characteristics of the link, such as, a length value of the link. In this way, the information dimension represented by the first network can be further enriched, which lays a foundation for subsequently maximizing representation of the interrelation between different information. Moreover, the above process is simple to be implemented, which lays the foundation for industrialized applications.

At S102, offline information obtained at least from mobile communication data is taken as second nodes, and a second network with the second nodes is constructed based on an association among the offline information, the offline information including at least one terminal identifier and location information of a terminal corresponding to the at least one terminal identifier.

The offline information in the embodiment of the present application may be at least one of the following information: a terminal identifier, location information, a motion trajectory, traffic information, information of Wifi-to-shop, and the like. Here, the Wifi-to-shop refers to a user location determined by connecting a Wifi signal through a terminal, and related information of a physical store, to which the Wifi signal belongs.

In a specific example, the second network may be constructed by using the following approaches of 1 to 2.

Approach 1: the terminal identifier obtained from the mobile communication data and location information of a terminal corresponding to the terminal identifier are taken as the second nodes, and the second network with the second node is constructed based on an association between the terminal identifier and the location information of the terminal corresponding to the terminal identifier.

In other words, the offline information with multiple dimensions is homogenized and taken as the nodes in the second network. For example, the terminal identifier and the location information of the terminal corresponding to the terminal identifier are taken as the second nodes. Then the second network is constructed based on the association between the terminal identifier and the location information, so that the second network can represent the association between the terminal identifier and the geographical location. In this way, the information demension represented by the nodes in the second network are enriched, thereby enriching the node dimension in the second network and expanding the second network, which lays the foundation for subsequently maximizing representation of the interrelation between different information.

Approach 2: the terminal identifier obtained from the mobile communication data, a motion trajectory of the terminal corresponding to the terminal identifier, and a start point and an end point corresponding to the motion trajectory are taken as the second node; and the second network with the second nodes is constructed based on associations between the terminal identifier and the motion trajectory, between the terminal identifier and the start point, and between the terminal identifier and the end point.

In other words, the offline information with multiple dimensions is homogenized and taken as nodes in the second network. For example, the terminal identifier, the motion trajectory of the terminal corresponding to the terminal identifier, and the start point and the end point corresponding to the motion trajectory are taken as the second nodes. Then the second network is constructed based on an associations between the terminal identifier and the motion trajectory, between the terminal identifier and the start point, and between the terminal identifier and the end point, so that the second network can represent the associations between the terminal identifier and the geographical location, and between the terminal identifier and the motion trajectory. In this way, the information dimension represented by the nodes in the second network is enriched, thereby enriching the node dimension in the second network and expanding the second network, which lays the foundation for subsequently maximizing representation of the interrelation between different information.

In a practical application, one of the above two approaches may be selected and executed, or both of them may be selected and executed, which is not limited in this embodiment of the present application, and may be applied according to requirements of an practical scenario.

In another specific example, nodes in the first network may be connected by using the following method, which specifically includes: determining a length of a link between the terminal identifier and the location information associated with the terminal identifier, based on an association between the terminal identifier and the location information in the offline information; and constructing the second network with the second nodes by using the length of the link between the terminal identifier and the location information associated with the terminal identifier.

In other words, the offline information with multiple dimensions is homogenized and taken as nodes in the second network. Then, the length of the link can be determined based on an association among the information with multiple different dimensions, wherein the link is between the second node representing the terminal identifier and the second node representing the location information (that is, the location information of the terminal corresponding to the terminal identifier) associated with the terminal identifier. In this way, the two second nodes are connected to construct the second network, so that not only can the association between the terminal identifier and a geographical location be represented by the second network, but also the association strength between associated nodes can be represented using the characteristics of the side, such as, a length value of the side. In this way, the information dimension represented by the second network is further enriched, which lays a foundation for subsequently maximizing representation of the interrelation between different information. Moreover, the above process is simple to be implemented, which lays the foundation for engineering applications.

At S103, the first network and the second network are converged by using an association between the account in the online information and the terminal identifier in the offline information, to construct a heterogeneous network.

Here, the heterogeneous network constructed in the embodiment of the present application is multivariate, that is, a multi-heterogeneous network. Further, in a practical application, vector features of nodes in the heterogeneous network can be determined. A distance between the nodes in a convergence space represented by the heterogeneous network is calculated from the vector features of the nodes. Here, each node in the heterogeneous network is represented by a vector, and each vector corresponds to the same heterogeneous space (corresponding to a multivariate space, i.e., a convergence space). Therefore, the nodes are comparable under the heterogeneous space, which solves the problem that nodes are not comparable across networks, and lays the foundation for a subsequent research on user behavior from different dimensions based on the heterogeneous space. Moreover, the association strength between the nodes can be represented in the convergence space by using the distance, thereby enriching the information dimension of the heterogeneous network.

In a specific example, weights of different networks can be determined according to different business requirements, and a length of a link in a network can be weighted using a weight corresponding to the network, so that weights of different networks are comparable. In this case, the heterogeneous network may better represent the interaction between different nodes in the real environment/scenario, which lays a solid network foundation for a subsequent information research from different dimensions. Particularly, weights of the first network and the second network are obtained, and a length of a link in the first network and a length of a link in the second network are weighted by using the weights of the first network and the second network, to determine a length of a link between nodes in the heterogeneous network.

In the embodiment of the present application, the network convergence may be performed by using the following approaches.

Approach 1: an association between user information corresponding to the first account in the online information and user information corresponding to the terminal identifier in the offline information is determined; in a case that the association is determined, the first network and the second network is converged based on the association, to construct the heterogeneous network.

Particularly, a specific way is provided for convergence based on the association between the online and offline information in the approach. That is, the first network and the second network are converged based on the user information corresponding to the account in the online information and the user information corresponding to the terminal identifier in the offline information. In other words, the first network and the second network are converged based on the user information. For example, in a case that there is an association between the user information corresponding to the first account and the user information corresponding to the terminal identifier, the first node corresponding to the first account can be directly connected to the second node corresponding to the terminal identifier based on this association, so that the first network and the second network are converged. This convergence approach is not only simple to be implemented, but also true and easy to be understood. In this way, the heterogeneous space is also easy to be understood, which lays a foundation for subsequently maximizing representation of the interrelation between different nodes, and also lays a foundation for a subsequent research on user behavior from different dimensions based on the heterogeneous network.

Approach 2: it is determined that user information corresponding to a first account in the online information is the same as user information corresponding to the terminal identifier in the offline information; and the first node representing the first account and the second node representing the terminal identifier is converged into a convergence node representing the user information in response to determining the same user information, to construct the heterogeneous network with the first nodes, the second nodes, and the convergence node.

Particularly, a specific way is provided for convergence based on the association between the online and offline information in the approach. That is, the first network and the second network are converged based on the user information corresponding to the account in the online information and the user information corresponding to the terminal identifier in the offline information. For example, when the user information represented by the two networks is the same, the first node representing the first account and the second node representing the terminal identifier may be converged into a convergence node representing the user information, thereby achieving the convergence of the first network and the second network, enriching the information dimension represented by the nodes in the heterogeneous network, and further enriching the node dimension in the heterogeneous network. This approach is simple and easy to be understood, which lays a foundation for subsequently maximizing representation of the interrelation between different information, and also lays a foundation for a subsequent research on user behavior from different dimensions based on the heterogeneous space.

Approach 3: it is determined that user information corresponding to a first account in the online information is different from user information corresponding to the terminal identifier in the offline information; it is determined whether there is an interaction between a third account corresponding to the terminal identifier and the first account, in response to determining different user information; in a case that there is the interaction, the first node representing the first account is connected with the second node representing the terminal identifier corresponding to the third account based on the interaction, to converge the first network and the second network to obtain the heterogeneous network.

Particularly, an approach is provided for convergence based on the association between the online and offline information in the approach. That is, the first network and the second network are converged based on the user information corresponding to the account in the online information and the user information corresponding to the terminal identifier in the offline information. For example, when the user information represented by the two networks is different, it can be further determined whether the terminal identifier corresponds to a third account. In a case that the terminal identifier corresponds to a third account, it can be further determined whether there is an interaction between the third account and the first account. In a case that there is the interaction, based on the interaction, the first node representing the first account is connected to the second node representing the terminal identifier corresponding to the third account, to converge the first network and the second network. This approach is simple and easy to be understood, which lays a foundation for subsequently maximizing representation of the interrelation between different information, and also lays a foundation for a subsequent research on user behavior from different dimensions based on the heterogeneous space.

In a practical application, one of the above three approaches may be selected and executed, or any two or three of them may be selected and executed, which is not limited in this embodiment of the present application, and may be applied according to requirements of an practical scenario.

In this way, the first network for the internet virtual space is established using the online information, and the second network for the true physical space is established using the offline information. Then the network is converged by using the association between the online and offline information, such as the association between the account in the online information and the terminal identifier in the offline information. In this way, the heterogeneous network is constructed, and the heterogeneous network is the multi-heterogeneous network, which not only expresses the online information such as the account and the network media information, but also expresses the offline information such as the terminal identifier and the location information. This will maximize the reservation of the online information, the offline information, and various interactions between the online and offline information, so that the online information and the offline information can be converged, thereby solving the problem of loss of the network information.

Moreover, as each node in the heterogeneous network corresponds to the same heterogeneous space (that is, the convergence space), the nodes are comparable under the heterogeneous space, which solves the problem that nodes are not comparable across the networks, and lays a foundation for a subsequent research on user behavior from different dimensions based on the heterogeneous space.

Figure 2:
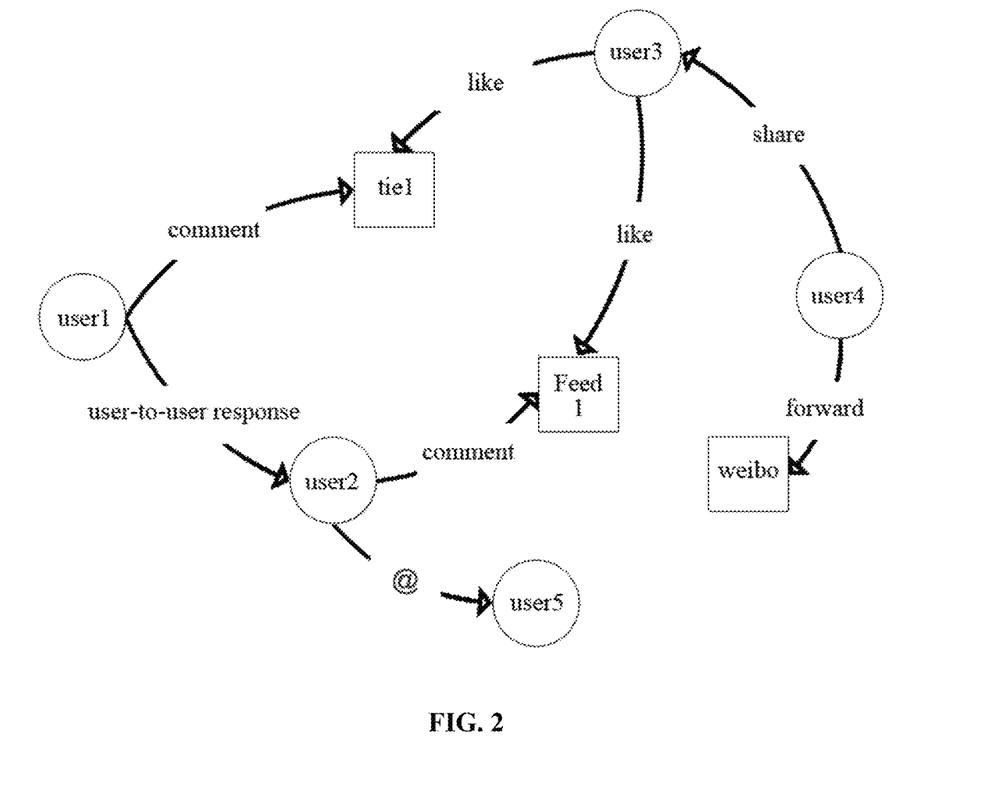
FIG. 2 is a first schematic diagram of a network structure of a specific application according to an embodiment of the present application.
Figure 3:
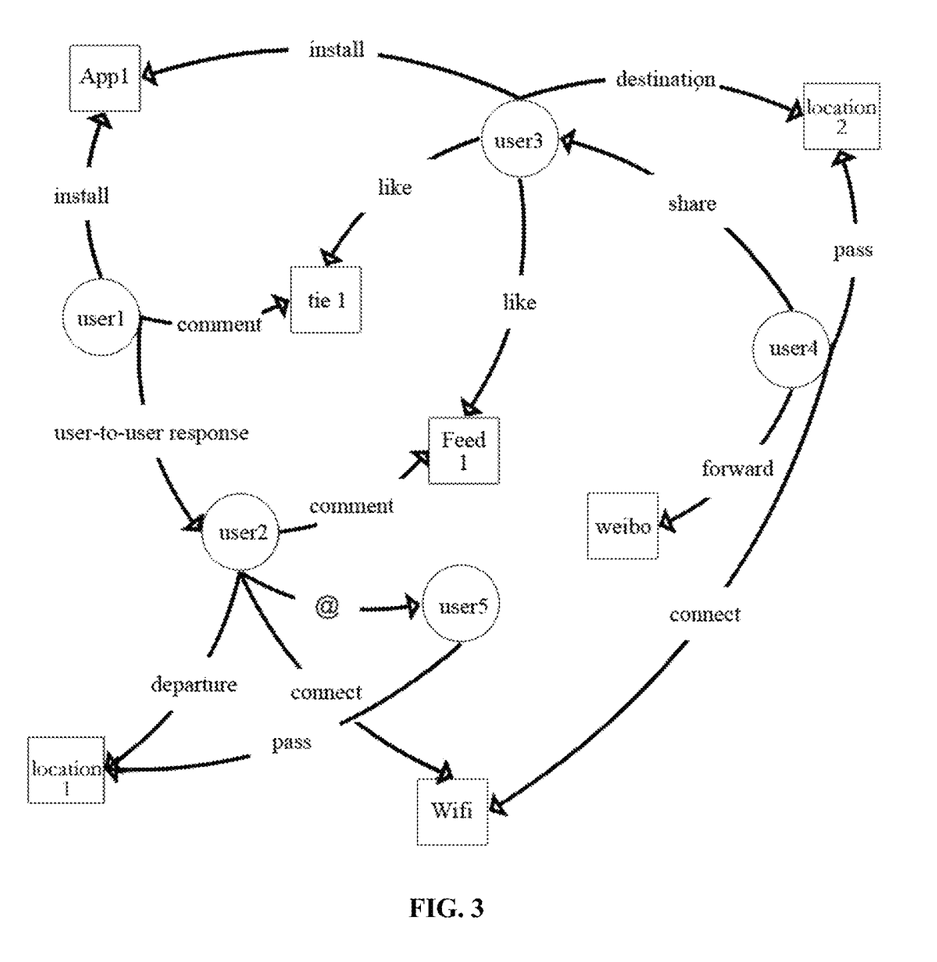
FIG. 3 is a second schematic diagram of a network structure of a specific application according to an embodiment of the present application.

The embodiment of the present application is described in detail with reference to specific examples below. FIG. 2 is a first schematic diagram of a network structure of a specific application according to an embodiment of the present application. FIG. 3 is a second schematic diagram of a network structure of a specific application according to an embodiment of the present application. A construction process of a heterogeneous network is also explained in combination with the network structures shown in FIG. 2 and FIG. 3.

Firstly, a network for an online information space is established. The online information space is diverse. This example is only for illustration, which will not be limited to the following information space. Particularly, as shown in FIG. 2, a relation information network is established for a virtual space by using user interaction behavior of each online data source. For example, based on a Post Bar data source, the following relations are established: a comment relation between a user and a Post Bar (such as a comment relation between a user 1 and tie 1 commented by the user 1), a user-to-user response relation (such as a user-to-user response relation between the user 1 and a user 2), a relation between a user and a post liked by the user (such as a relation between a user 3 and the tie1 liked by the user 3), and a relation between a user and another user concerned by the user. For another example, based on a Feed traffic, the following relations are established: a relation between a user and a Feed graphic text (such as a relation between the user 2 and Feed 1 commented by the user 2), a relation between a user and a Feed graphic text liked by the user (such as a relation between the user 3 and Feed 1 liked by the user 3), a sharing relation between users (such as a sharing relation between the user 3 and a user 4, wherein the shared Feed graphic text is not shown in the figure). For another example, based on a Feed traffic, the following relations are established: a forwarding relation between a user and a microblog (such as a relation between the user 4 and a microblog forwarded by the user 4), a user @ user relation (such as a "@" (referring to call) relation between the user 2 and a user 5 called by the user 2), and a comment relation of a user and a microblog commented by the user, a writing relation of a user and a microblog written by the user, and the like. For another example, a heterogeneous relation network between users, and between users and entities can be established based on data sources such as video and the like. For another example, based on a niche vertical application, a dependency relation between user installation and usage of an application is established, and a duration of use of the application is taken as a weight. Based on an occurrence frequency of a relation between nodes, or a duration of use of the application, a length of a link is determined for the relation link.

Secondly, a network for an offline information space is established. The offline information space is diverse. This example is only for illustration, and is not limited to the following information spaces. For example, a link relation between a user and a Wifi entity over a period of time is established based on Wifi-to-shop, and a time-weighted total number is taken as a weight of a length of a link. For example, based on positioning data of a user's trip, a relation of the user and a passing location is established, for example, a trip may be divided into three relations based on the locations, that is, "departure", "passing", "destination", so that the relation between the user and the passing location can be established. As shown in FIG. 3, a destination relation is established between the user 3 and a location 2; a passing relation is established between the location 2 and Wifi, that is, the location 2 is passing through a radiating area of Wifi; a passing relation is established between the user 5 and the location 1; a departure relation is established between the user 2 and the location 1; a connection relation is established between the user 2 and Wifi, and so on.

Thirdly, unary relation networks for the online and offline are converged. The user information is used to converge the networks. For example, a user's unique ID is taken as a common point to converge multiple networks into a unified heterogeneous network. FIG. 3 shows a converged heterogeneous network based on the user information.

Here, weights can be configured for different networks based on business scenarios or empirical judgments. The lengths of the links are weighted by using the weights corresponding to the networks so that the lengths of the links of different networks are comparable.

In a practical application, it is also possible to learn a low-dimensional representation of each node in a multi-heterogeneous network based on the converged multi-heterogeneous relation network, so that a network structure is formed by combining the online and offline relations of user dimensions, and a relation between users and other information is represented by using a low-dimensional digital vector. For example, an embedding vector of each node in the heterogeneous network are learned based on a training method, such as Graph Embedding, and a method using a random walk-based path sampling, or a training method using a GCN-style neural network, and each vector is in a comparable information space dimension, which lays a foundation for calculating distances between users in the business, distances between users and other information (for example, information other than users in FIG. 2 and FIG. 3), and distances among other information.

Further, on the basis of the heterogeneous network, the nodes are clustered through the similarity calculation of Graph Embedding, or a community is discovered based on the graph structure itself, that is, a community containing some users can be obtained. And, online points of interest and concerns from users of this community in the past period of time, such as a Post Bar, a microblog, and a Feed, can be obtained. Moreover, the offline information such as frequent geographic locations and Wifi accessed commonly in the past period of time can also be obtained. Therefore, based on the information, some applications in urban management may be completed. For example, it is possible to give more reasonable trip suggestions and guidance to the user in ways of multivariate complementarity, based on establishment of the aforementioned heterogeneous network and determination of the embedding vector. After the user actively expresses a desired destination, a passing location of the user can be obtained based on the multi-heterogeneous relation network. And at the same time, it can be obtained whether there is a user's online concern point near the passing location. Then, through the online concern point and the passing location entity of this trip, a location where the user wants to go and an item that the user wants to complete can be calculated, such as shopping in the mall or dining and the like. In this way, a route can be recommended to a user not only simply by relying on the shortest distance or the shortest time, but also by suggesting completing items in a more lifelike manner.

In this way, a network is established based on the online information in an internet virtual space, and another network is established based on the offline information such as a geographic location space, so that the two networks are converged based on an association between the online information the online information and the offline information, to obtain the heterogeneous network. In this way, the nodes across the networks are comparable in a heterogeneous space corresponding to the heterogeneous network, which maximize reservation of the interrelation information between different information. At the same time, it lays the foundation for the information research from different dimensions based on the heterogeneous network.

Figure 4:
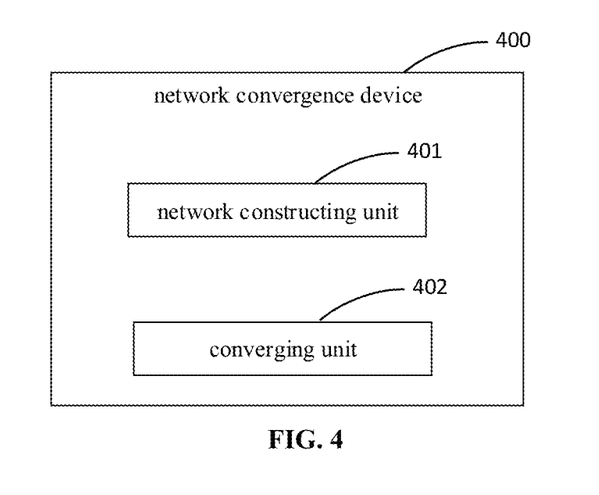
FIG. 4 is a block diagram of a network convergence device according to an embodiment of the present application.

A network convergence device 400 is further provided according to an embodiment of the application, as shown in FIG. 4. The device includes:

a network constructing unit 401, configured to take online information obtained at least from network data as first nodes, and construct a first network with the first nodes based on an association among the online information, the online information including at least one account and at least one piece of network media information; take offline information obtained at least from mobile communication data as second nodes, and construct a second network with the second nodes based on an association among the offline information, the offline information including at least one terminal identifier and location information of a terminal corresponding to the at least one terminal identifier; and a converging unit 402, configured to converge the first network and the second network by using an association between the account in the online information and the terminal identifier in the offline information, to construct a heterogeneous network.

In an embodiment, the network constructing unit 401 is further configured to: take a first account obtained from the network data and the network media information accessed by the first account, as the first node; and construct the first network with the first nodes based on an access relation.

In an embodiment, the network constructing unit 401 is further configured to: take a first account obtained from the network data and an application logged in and accessed by the first account, as the first node; and construct the first network with the first nodes based on a logged-in access relation.

In an embodiment, the network constructing unit 401 is further configured to: take a first account obtained from the network data and a second account having an interaction with the first account, as the first node; and construct the first network with the first nodes based on the interaction between the first account and the second account.

In an embodiment, the network constructing unit 401 is further configured to:

determine a length of a link between the account and the network media information accessed by the account, based on an association between the account and the network media information in the online information; and construct the first network with the first nodes by using the length of the link between the account and network media information accessed by the account.

In an embodiment, the network constructing unit 401 is further configured to:

take the terminal identifier obtained from the mobile communication data, a motion trajectory of the terminal corresponding to the terminal identifier, and a start point and an end point corresponding to the motion trajectory, as the second nodes; and construct the second network with the second nodes based on associations between the terminal identifier and the motion trajectory, between the terminal identifier and the start point, and between the terminal identifier and the end point.

In an embodiment, the network constructing unit 401 is further configured to:

determine a length of a link between the terminal identifier and the location information associated with the terminal identifier, based on an association between the terminal identifier and the location information in the offline information; and construct the second network with the second node by using the length of the link between the terminal identifier and the location information associated with the terminal identifier.

In an embodiment, the converging unit 402 is further configured to:

obtain weights of the first network and the second network, and weight a length of a link in the first network and a length of a link in the second network by using the weights of the first network and the second network respectively, to determine a length of a link between nodes in the heterogeneous network.

In an embodiment, the converging unit 402 is further configured to:

determine an association between user information corresponding to the first account in the online information and user information corresponding to the terminal identifier in the offline information; in a case that the association is determined, converge the first network and the second network based on the association, to construct the heterogeneous network.

In an embodiment, the converging unit 402 is further configured to:

determine that user information corresponding to a first account in the online information is the same as user information corresponding to the terminal identifier in the offline information; and converge the first node representing the first account and the second node representing the terminal identifier into a convergence node representing the user information in response to determining the same user information, to construct the heterogeneous network with the first nodes, the second nodes, and the convergence node.

In an embodiment, the converging unit 402 is further configured to:

determine that user information corresponding to a first account in the online information is different from user information corresponding to the terminal identifier in the offline information; determining whether there is an interaction between a third account corresponding to the terminal identifier and the first account, in response to determining different user information; in a case that there is the interaction, connect the first node representing the first account with the second node representing the terminal identifier corresponding to the third account based on the interaction, to converge the first network and the second network to obtain the heterogeneous network.

In an embodiment, the converging unit 402 is further configured to:

determine vector features of nodes in the heterogeneous network; and calculate a distance between the nodes in a convergence space represented by the heterogeneous network by using the vector features of the nodes.

In this embodiment, functions of units in the device refer to the corresponding description of the above mentioned method and thus the description thereof is omitted herein. For technical details that are not disclosed in the device embodiments of the present application, those skilled in the art may understand by referring to the description of the method embodiments of the present application.

According to embodiments of the present application, an electronic apparatus and a readable storage medium are further provided.

Figure 5:
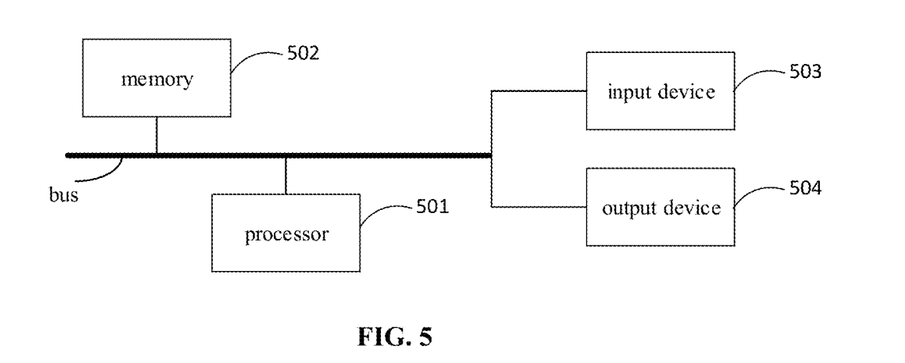
FIG. 5 is a block diagram of an electronic apparatus according to an embodiment of the present application.

As shown in FIG. 5, it is a block diagram of an electronic apparatus for the network convergence method according to an embodiment of the present application. The electronic apparatus are intended to represent various forms of digital computers, such as laptop computers, desktop computers, workbenches, personal digital assistants, servers, blade servers, mainframe computers, and other suitable computers. Electronic apparatus may also represent various forms of mobile devices, such as personal digital assistants, cellular phones, intelligent phones, wearable devices, and other similar computing devices. The components shown here, their connections and relations, and their functions are merely examples, and are not intended to limit the implementation of the application described and/or required herein.

As shown in FIG. 5, the electronic apparatus includes: one or more processors 501, a memory 502, and interfaces for connecting various components, which include a high-speed interface and a low-speed interface. The various components are interconnected using different buses and can be mounted on a common motherboard or otherwise installed as required. The processor may process instructions executed within the electronic apparatus, which include instructions stored in or on a memory to display graphic information of a graphical user interface (GUI) on an external input/output device (such as a display device coupled to the interface). In other embodiments, multiple processors and/or multiple buses can be used with multiple memories, if desired. Similarly, multiple electronic apparatus can be connected, each providing some of the necessary operations (for example, as a server array, a group of blade servers, or a multiprocessor system). A processor 501 is taken as an example in FIG. 5.

The memory 502 is a non-transitory computer-readable storage medium according to an embodiment of the present application. The memory stores instructions executable by at least one processor, so that the at least one processor executes the network convergence method according to the embodiments of the present application. The non-transitory computer-readable storage medium of the present application stores computer instructions, which are used to cause a computer to execute the network convergence method according to the embodiments of the present application.

As a non-transitory computer-readable storage medium, the memory 502 can be used to store non-transitory software programs, non-transitory computer executable programs, and modules, such as program instructions/modules/units corresponding to the network convergence method according to the embodiments of the present application (for example, the network constructing unit 401, and the converging unit 402 shown in FIG. 4). The processor 501 executes various functional applications and data processing of the server by running non-transitory software programs, instructions, and modules stored in the memory 502, that is, the network convergence method according to the embodiments of the present application can be implemented.

The memory 502 may include a storage program area and a storage data area, where the storage program area may store an operating system and an application program required for at least one function; and the storage data area may store data created according to the use of the electronic apparatus for the network convergence method, etc. In addition, the memory 502 may include a high-speed random access memory, and may also include a non-transitory memory, such as at least one magnetic disk storage device, a flash memory device, or other non-transitory solid-state storage device. In some embodiments, the memory 502 may optionally include a memory remotely set relative to the processor 501, and these remote memories may be connected to the electronic apparatus for the network convergence method via a network. Examples of the above network include, but are not limited to, the Internet, an intranet, a local area network, a mobile communication network, and combinations thereof.

The electronic apparatus for the network convergence method may further include an input device 503 and an output device 504. The processor 501, the memory 502, the input device 503, and the output device 504 may be connected through a bus or in other manners. In FIG. 5, the connection through the bus is taken as an example.

The input device 503 can receive inputted numeric or character information, and generate key signal inputs related to user settings and function control of an electronic apparatus for the network convergence method, such as a touch screen, a keypad, a mouse, a trackpad, a touchpad, a pointing stick, one or more mouse buttons, a trackball, a joystick and other input devices. The output device 504 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein can be implemented in digital electronic circuit systems, integrated circuit systems, application specific integrated circuits (ASICs), computer hardwares, firmwares, softwares, and/or combinations thereof. These various embodiments may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit data and instructions to the storage system, the at least one input device, and the at least one output device.

These computing programs (also known as programs, software, software applications, or codes) include machine instructions of a programmable processor and can be implemented using high-level procedures and/or object-oriented programming languages, and/or assembly/machine languages. As used herein, the terms "machine-readable medium" and "computer-readable medium" refer to any computer program product, device, and/or device used to provide machine instructions and/or data to a programmable processor (for example, magnetic disks, optical disks, memories, and programmable logic devices (PLDs)), include machine-readable media that receives machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a Cathode Ray Tube (CRT) or Liquid Crystal Display (LCD) monitor) for displaying information to the user; and a keyboard and pointing device (such as a mouse or trackball) through which the user can provide input into a computer. Other kinds of devices may also be used to provide interaction with the user. For example, the feedback provided to the user may be any form of sensory feedback (for example, visual feedback, auditory feedback, or haptic feedback); and may be in any form (including acoustic input, voice input, or tactile input) to receive input from the user.

The systems and technologies described herein can be implemented in a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including any combination of such background components, middleware components, and front-end components. The components of the system may be interconnected by any form or medium of digital data communication (such as, a communication network). Examples of communication networks include: a local area network (LAN), a wide area network (WAN), and the Internet.

The computer system may include clients and servers. The client and server are generally remote from each other and typically interact through a communication network. The client-server relation is generated by computer programs running on the respective computers and having a client-server relation with each other.

In this way, according to the technical solutions of the embodiments of the application, the first network for the internet virtual space is established using the online information, and the second network for the true physical space is established using the offline information. Then the first network and the second network are converged by using the association between the online and offline information, such as the association between the account in the online information and the terminal identifier in the offline information. In this way, the heterogeneous network is constructed, and the heterogeneous network is the multi-heterogeneous network, which not only expresses the online information such as the account and the network media information, but also expresses the offline information such as the terminal identifier and the location information. Therefore, this will maximize the reservation of the online information, the offline information, and various interactions between the online and offline information, so that the online information and the offline information can be converged, thereby solving the problem of loss of the network information.

Moreover, as each node in the heterogeneous network corresponds to the same heterogeneous space (that is, the convergence space), the nodes are comparable under the heterogeneous space, which solves the problem that nodes are not comparable across the networks, and lays a foundation for a subsequent research on user behavior from different dimensions based on the heterogeneous space.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific embodiments do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A network convergence method, comprising:
taking online information obtained at least from network data as first nodes, and constructing a first network with the first nodes based on an association among the online information, the online information comprising at least one account and at least one piece of network media information;
taking offline information obtained at least from mobile communication data as second nodes, and constructing a second network with the second nodes based on an association among the offline information, the offline information comprising at least one terminal identifier and location information of a terminal corresponding to the at least one terminal identifier; and
converging the first network and the second network by using an association between the account in the online information and the terminal identifier in the offline information, to construct a heterogeneous network.

2. The network convergence method according to claim 1, wherein the taking online information obtained at least from network data as first nodes, and constructing a first network with the first nodes based on an association among the online information comprises:

taking a first account obtained from the network data and the network media information accessed by the first account, as the first nodes; and constructing the first network with the first nodes based on an access relation.

3. The network convergence method according to claim 1, further comprising:

taking a first account obtained from the network data and an application logged in and accessed by the first account, as the first nodes; and constructing the first network with the first nodes based on a logged-in access relation.

4. The network convergence method according to claim 1, wherein the taking online information obtained at least from network data as first nodes, and constructing a first network with the first nodes based on an association among the online information further comprises:

taking a first account obtained from the network data and a second account having an interaction with the first account, as the first nodes; and constructing the first network with the first nodes based on the interaction between the first account and the second account.

5. The network convergence method according to claim 1, wherein the constructing a first network with the first nodes based on an association among the online information comprises:

determining a length of a link between the account and the network media information accessed by the account, based on an association between the account and the network media information in the online information; and     constructing the first network with the first nodes by using the length of the link between the account and network media information accessed by the account.

6. The network convergence method according to claim 1, wherein the taking offline information obtained at least from mobile communication data as second nodes, and constructing a second network with the second nodes based on an association among the offline information comprises:

taking the terminal identifier obtained from the mobile communication data, a motion trajectory of the terminal corresponding to the terminal identifier, and a start point and an end point corresponding to the motion trajectory, as the second nodes; and constructing the second network with the second nodes based on associations between the terminal identifier and the motion trajectory, between the terminal identifier and the start point, and between the terminal identifier and the end point.

7. The network convergence method according to claim 1, wherein the constructing a second network with the second nodes based on an association among the offline information comprises:

determining a length of a link between the terminal identifier and the location information associated with the terminal identifier, based on an association between the terminal identifier and the location information in the offline information; and     constructing the second network with the second nodes by using the length of the link between the terminal identifier and the location information associated with the terminal identifier.

8. The network convergence method according to claim 5, further comprising:

obtaining weights of the first network and the second network, and weighting a length of a link in the first network and a length of a link in the second network by using the weights of the first network and the second network respectively, to determine a length of a link between nodes in the heterogeneous network.

9. The network convergence method according to claim 1, wherein the converging the first network and the second network by using an association between the account in the online information and the terminal identifier in the offline information comprises:

determining an association between user information corresponding to the first account in the online information and user information corresponding to the terminal identifier in the offline information; in a case that the association is determined, converging the first network and the second network based on the association, to construct the heterogeneous network.

10. The network convergence method according to claim 1, wherein the converging the first network and the second network by using an association between the account in the online information and the terminal identifier in the offline information comprises:

determining that user information corresponding to a first account in the online information is the same as user information corresponding to the terminal identifier in the offline information; and converging the first node representing the first account and the second node representing the terminal identifier into a convergence node representing the user information in response to determining the same user information, to construct the heterogeneous network with the first nodes, the second nodes, and the convergence node.

11. The network convergence method according to claim 1, wherein the converging the first network and the second network by using an association between the account in the online information and the terminal identifier in the offline information comprises:

determining that user information corresponding to a first account in the online information is different from user information corresponding to the terminal identifier in the offline information; determining whether there is an interaction between a third account corresponding to the terminal identifier and the first account, in response to determining different user information; in a case that there is the interaction, connecting the first node representing the first account with the second node representing the terminal identifier corresponding to the third account based on the interaction, to converge the first network and the second network to obtain the heterogeneous network.

12. The network convergence method according to claim 1, further comprising:

determining vector features of nodes in the heterogeneous network; and     calculating a distance between the nodes in a convergence space represented by the heterogeneous network by using the vector features of the nodes.

13. A network convergence device, comprising:

one or more processors; and a storage device configured to store one or more programs, wherein     the one or more programs, when executed by the one or more processors, cause the one or more processors to:

take online information obtained at least from network data as first nodes, and construct a first network with the first nodes based on an association among the online information, the online information comprising at least one account and at least one piece of network media information;

take offline information obtained at least from mobile communication data as second nodes, and construct a second network with the second nodes based on an association among the offline information, the offline information comprising at least one terminal identifier and location information of a terminal corresponding to the at least one terminal identifier; and converge the first network and the second network by using an association between the account in the online information and the terminal identifier in the offline information, to construct a heterogeneous network.

14. The network convergence device according to claim 13, wherein the one or more programs, when executed by the one or more processors, cause the one or more processors further to:

take a first account obtained from the network data and an application logged in and accessed by the first account, as the first nodes; and construct the first network with the first nodes based on a logged-in access relation.

15. The network convergence device according to claim 13, wherein the one or more programs, when executed by the one or more processors, cause the one or more processors further to:

take a first account obtained from the network data and a second account having an interaction with the first account, as the first nodes; and construct the first network with the first nodes based on the interaction between the first account and the second account.

16. The network convergence device according to claim 13, wherein the one or more programs, when executed by the one or more processors, cause the one or more processors further to:

take the terminal identifier obtained from the mobile communication data, a motion trajectory of the terminal corresponding to the terminal identifier, and a start point and an end point corresponding to the motion trajectory, as the second nodes; and construct the second network with the second nodes based on associations between the terminal identifier and the motion trajectory, between the terminal identifier and the start point, and between the terminal identifier and the end point.

17. The network convergence device according to claim 13, wherein the one or more programs, when executed by the one or more processors, cause the one or more processors further to:

determine an association between user information corresponding to the first account in the online information and user information corresponding to the terminal identifier in the offline information; in a case that the association is determined, converge the first network and the second network based on the association, to construct the heterogeneous network.

18. The network convergence device according to claim 13, wherein the one or more programs, when executed by the one or more processors, cause the one or more processors further to:

determine vector features of nodes in the heterogeneous network; and calculate a distance between the nodes in a convergence space represented by the heterogeneous network by using the vector features of the nodes.

19. The network convergence device according to claim 13, wherein the one or more programs, when executed by the one or more processors, cause the one or more processors further to:

take a first account obtained from the network data and the network media information accessed by the first account, as the first nodes; and construct the first network with the first nodes based on an access relation.

20. A non-transitory computer-readable storage medium, comprising computer executable instructions stored thereon, wherein the executable instructions, when executed by a computer, causes the computer to:

take online information obtained at least from network data as first nodes, and construct a first network with the first nodes based on an association among the online information, the online information comprising at least one account and at least one piece of network media information;

take offline information obtained at least from mobile communication data as second nodes, and construct a second network with the second nodes based on an association among the offline information, the offline information comprising at least one terminal identifier and location information of a terminal corresponding to the at least one terminal identifier; and converge the first network and the second network by using an association between the account in the online information and the terminal identifier in the offline information, to construct a heterogeneous network.

* * * * *